UNITED STATES PATENT OFFICE.

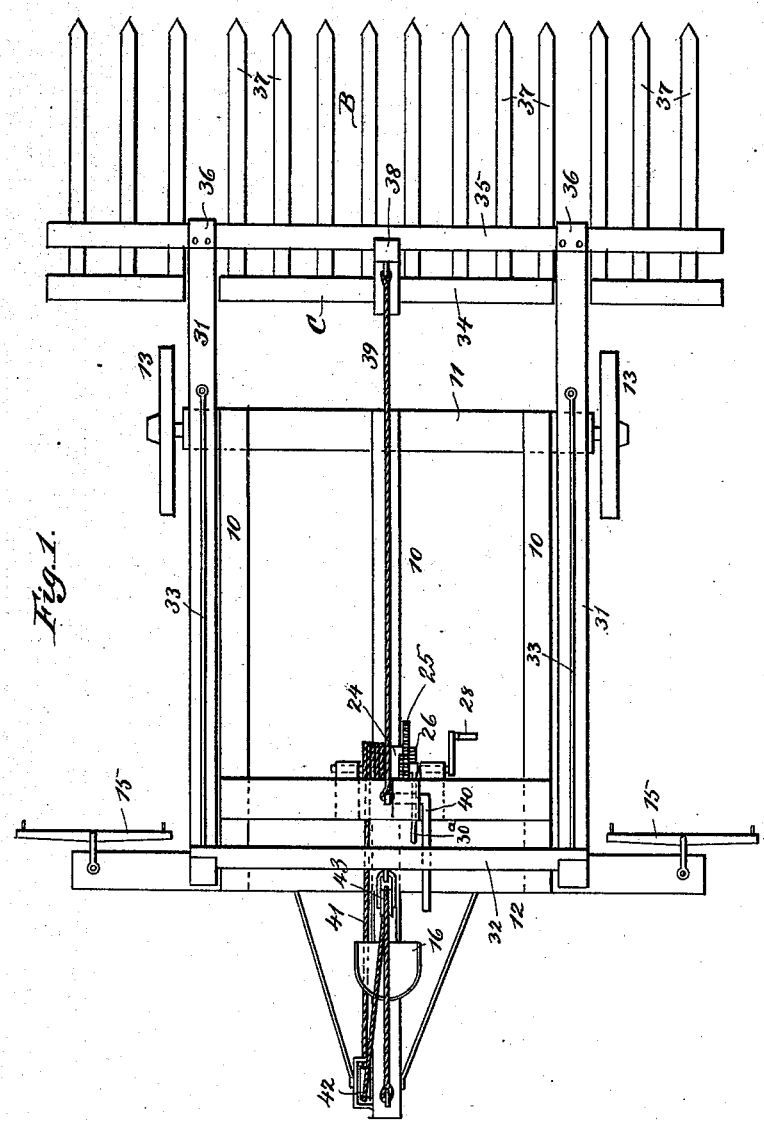

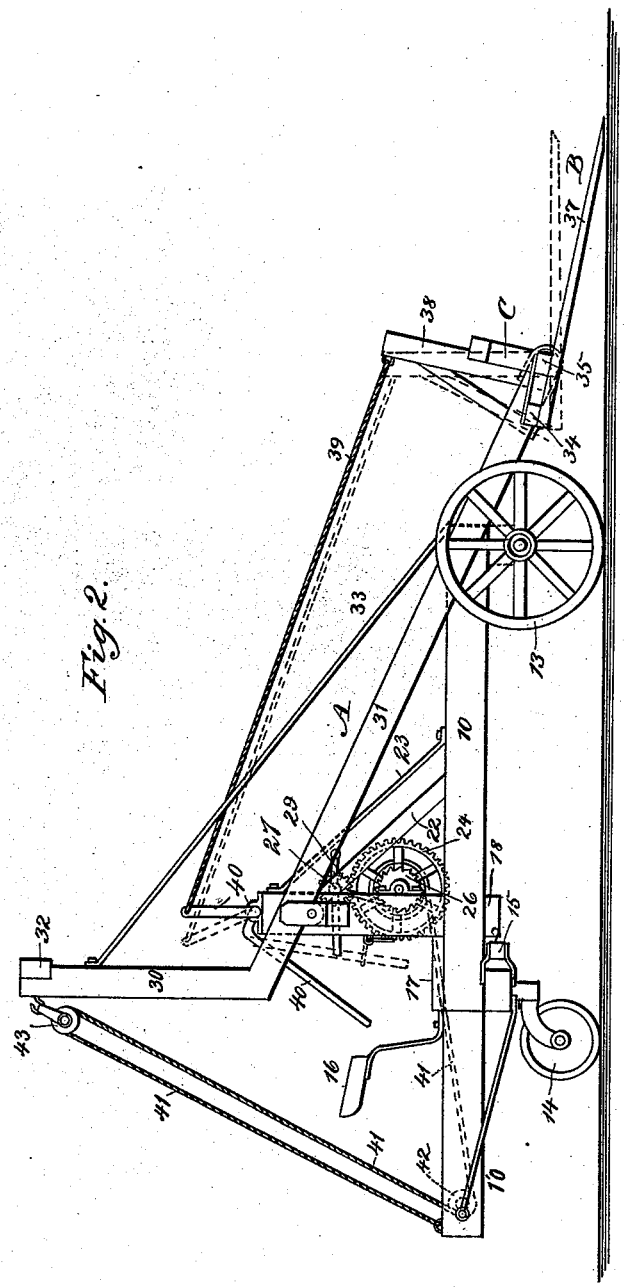

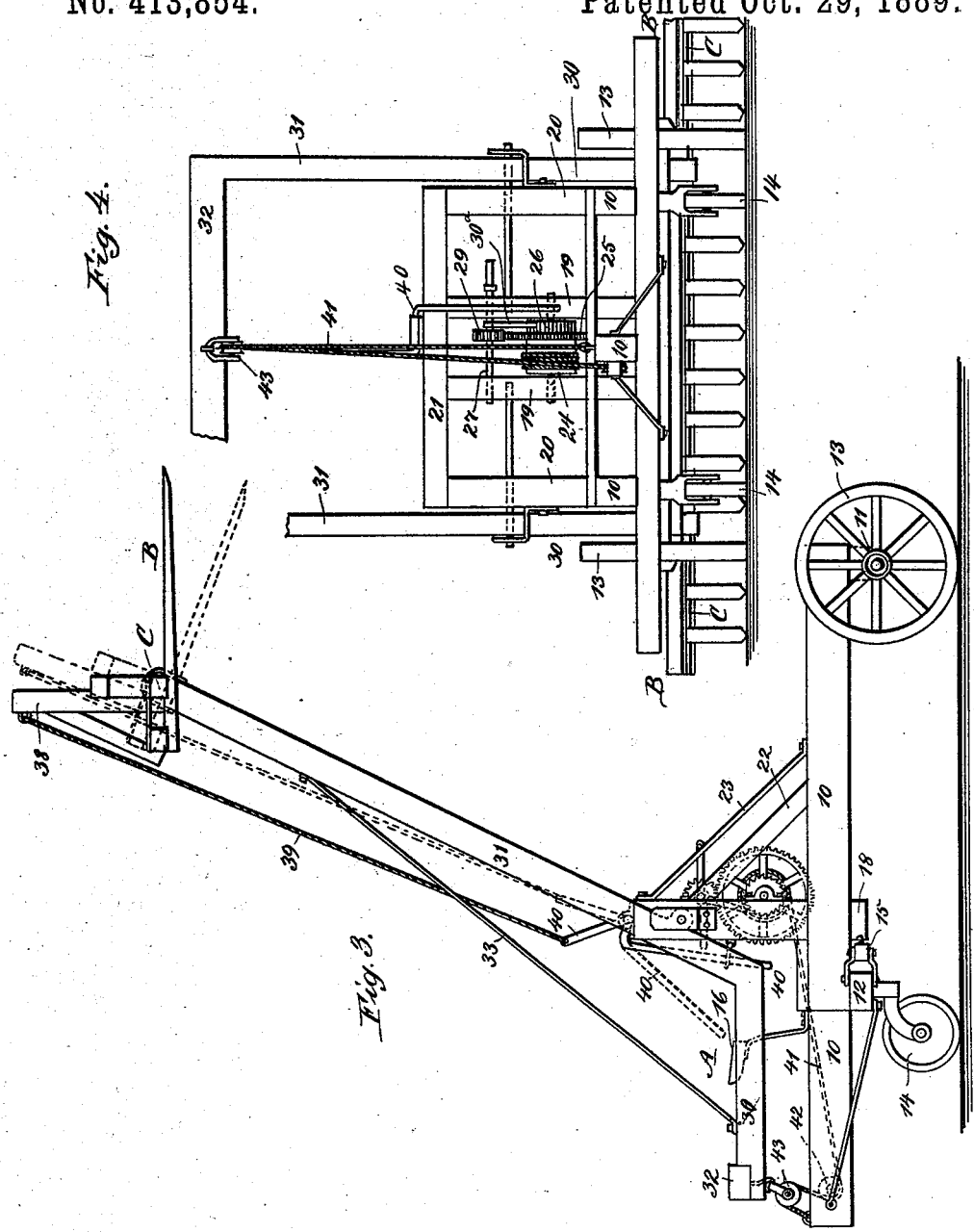

PETER HEINTZ, OF GRAND ISLAND, NEBRASKA.

COMBINED HAY RAKE AND STACKER.

SPECIFICATION forming part of Letters Patent No. 413,854, dated October 29, 1889.

Application filed April 19, 1889. Serial No. 307,666. (No model.)

*To all whom it may concern:*

Be it known that I, PETER HEINTZ, of Grand Island, in the county of Hall and State of Nebraska, have invented a new and Improved Combined Hay Rake and Stacker, of which the following is a full, clear, and exact description.

My invention relates to a combined hay rake and stacker, and has for its object to provide a simple, durable, and economical machine which will effectually gather the hay, carry the same when gathered, and deposit the load at any desired point upon the ground or at an elevation above the ground.

A further object of the invention is to provide a machine capable of being driven with its load close to a stack, and which will be easy upon the team and readily and conveniently manipulated.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1 is a plan view of the machine. Fig. 2 is a side elevation of the same, showing in positive lines the rake upon the ground and in dotted lines the said rake in position to carry the load. Fig. 3 is a side elevation of the machine, illustrating the rake as elevated to dump the load upon a high stack; and Fig. 4 is an end view of the machine.

The base-frame of the machine comprises three or more spaced longitudinal beams 10, the center beam of which projects rearwardly a greater distance than do the others, the said beams 10 being united at the front by a cross-bar 11 and at the rear by a second cross-bar 12, which latter cross-bar is made to project a distance beyond the outer face of the side beams 10, and is preferably placed flush with the rear ends of the said outer side beams, as best illustrated in Fig. 1, whereby the central longitudinal beam 10 projects rearward beyond the rear cross-beam. If in practice it is found desirable, the forward cross-beam 11, constituting a portion of the base-frame, may also form the forward axle, upon which the drive-wheels 13 may be journaled; or the axle carrying the drive-wheels may be secured to the under face of the cross-beam. The rear cross-beam is supported by two caster-wheels 14, located, preferably, directly under the side beams 10, as illustrated in Figs. 2 and 4, the caster-wheels permitting the machine to be readily turned conveniently and quickly in any direction. Upon the projecting ends of the rear cross-beam 12, at its forward side, a singletree 15 is attached, to which singletrees the horses used to draw the machine are attached. The two horses are driven by independent lines leading inward to the driver's seat 16, which seat is supported upon a suitable standard attached to the upper face of the rear extension of the central base-beam 10. Upon the rear portion of the body of the base-frame a platform 17 is constructed, which platform is immediately in front of the driver's seat, and is of sufficient width to permit the operator to stand readily thereon. In front of the platform 17 an intermediate cross-bar 18 is attached to the under face of the base-frame of the machine, and from the said intermediate cross-bar 18, at each side of the center frame-beam 10, a vertical standard 19 is projected, and from the upper face of each end beam 10 of the frame, transversely aligning the standards 19, other standards 20, of equal length, are vertically projected, the said standards 19 and 20 being connected at the top by a cross head or beam 21, as best shown in Fig. 4. The outer standards 20 are ordinarily strengthened by means of braces 22, as shown in Figs. 2 and 3, and the cross-head 21 is stayed, preferably, by means of a rod 23, attached to its front face at the center, and also to the intermediate cross-beam of the frame. Between the standards 19 a drum 24 is pivoted, provided with a toothed head 25 and a ratchet-wheel 26, integral with the outer face of the said head. Above the drum a shaft 27 is journaled in the said standards 19, preferably rotated by means of an attached crank-arm 28, which shaft has attached thereto a pinion 29, meshing with the toothed head of the drum, and the shaft has likewise pivoted thereon a pawl 30ª, capable of contact with the ratchet-wheel 26, as best illustrated in Fig. 4. Thus by rotating the shaft 27 the drum 24 is revolved, and by engagement of the pawl with the ratchet-wheel of the drum, when the rope hereinafter described is wound upon the drum, said rope is prevented from being unwound until so desired by the operator. Upon the outer standards 20, secured to the base-frame, the side arms 31 of the lifting-frame A are fulcrumed, the fulcrum of the said arms being near the rear end, and the length of the arms being such that they will project beyond the forward end of the base-frame.

From the rear end of each side arm 31 of the lifting-frame A an upwardly and rearwardly inclined bar or beam 30 projects, which bars or beams form a continuation of the lifting-frame, and are united at their upper ends by a cross-bar 32. By this construction I obtain an angled lifting-frame having a decidedly rear overhang.

In order to strengthen the lifting-frame and render the same rigid to facilitate its manipulation, a brace-rod 33 is attached to the forward face of each of the rear members 30 and to the upper face of each of the straight members 31 at or near the forward end of the latter, as clearly illustrated in Fig. 2.

In the forward extremities of the lifting-frame A the rake B is pivoted in such manner that the said rake may be rocked in its bearings. The rake B comprises a head C, consisting of two parallel spaced bars 34 and 35, the outer bar 35 being journaled in suitable bearings 36, attached to the extremities of the lifting-frame, and the rear bar 34 being recessed to permit the head, when rocked, to pass above and below the side arms of the lifting-frame, as best shown in Fig. 1. In the head a series of horizontally-disposed teeth 37 are secured in any suitable or approved manner, and from the head of the rake, at the center of the same, a post 38 is upwardly projected, which post is connected by a rope 39 with an angle-lever 40, pivoted centrally upon the upper face of the cross-head 21, one member of said lever being adapted to project rearwardly downward convenient to the driver's seat, the upper member being secured to the said rope 39.

It is evident that when the downwardly-extending member of the lever 40 is thrown from the position shown in full lines, Fig. 2, to that shown in dotted lines and there locked to a standard 19 the rake will be brought to and held in a horizontal or carrying position after receiving its load, as is also shown in dotted lines, Fig. 2.

When the lifting-frame is carried to the essentially-vertical position illustrated in Fig. 3 to deposit the load of hay upon a high stack, by reason of the rake being loosely pivoted or journaled in the lifting-frame and its connection with the forward member of the lever 40, the said rake will maintain its horizontal position no matter at what elevation the frame may be carried. To dump the hay from the rake, the lever 40 is released from attachment to the standard 19, whereupon the rake will drop to the dotted position shown in Fig. 3.

The lifting-frame is manipulated from the drum, and the said manipulation is accomplished by securing to the said drum one end of a rope 41, which is carried from thence over a friction-pulley 42, located at one side and near the end of the rearwardly-projecting extremity of the central frame-beam 10, as shown in Fig. 1, and from thence upward over a pulley 43, attached to the cross-bar 32 of the lifting-frame at its center, as best shown in Fig. 2, from whence the said rope 41 is carried downward and firmly secured to the upper rear extremity of the said central frame-beam 10, as is also shown in Fig. 2.

By shaping the pivoted or lifting frame in the manner described—namely, with the upwardly-inclined rear overhang—sufficient leverage is obtained to enable the operator by manipulating the drum to easily raise a load to the height of eighteen feet. I am also enabled by this construction to apply the side brace-rods 33, which materially assist in the operation of raising the frame, as the parts thereof are rendered rigid. The braces also permit of the frame being made comparatively light. I am also enabled to set the raising-frame low down, and have plenty of space between the pulleys to raise the rake to the desired height.

In order to raise the load to an elevation of eighteen feet, the arms of the lifting-frame should extend eighteen feet forward from the fulcrum of the frame. By reason of the peculiar construction of the machine the operator is enabled to drive close to the stack before elevating the rake, thus avoiding the loss of hay consequent upon carrying the same at an elevation for any distance in windy weather.

In operation, when the machine has been driven upon the field, the lever 40 is loosened, the lifting-frame A being in the downwardly-inclined position illustrated in Fig. 2, whereby the rake-teeth drop to the ground. As the team is driven forward with the rake in this position, the hay is gathered up upon the rake, and when a sufficient load has been obtained the lever 40 is pressed downward and locked in any approved manner in this position, which movement of the lever elevates the rake, with its load, to the horizontal position illustrated in dotted lines in Fig. 2. The machine may now be driven to the stack or to the place where the stack is to be made, and, when such place is reached, by manipulating the shaft 27 the frame A is raised to a sufficient height, and when such height is reached the lever 40 is again loosened and the weight of the load upon the rake immediately dumps the latter. If the hay is to be delivered at quite an elevation from the ground, the frame A is carried upward substantially to the position illustrated in Fig. 3 before the lever 40 is loosened, and when said lever is loosened, as illustrated in dotted lines, Fig. 3, the rake drops from the horizontal position to a downwardly-inclined position, which permits the load to slide therefrom. Chains may be used in place of ropes 39 41, if desired.

Having thus described my invention, I claim as new and desire to secure by Letters Patent—

1. The combination, with the main frame, of a forwardly-inclined lifting-frame journaled thereon near its rear upper end, and provided in rear of its pivotal point with an upwardly-projecting extension 30 and at its front end with a pivoted rake, a lifting-rope connected to the upper end of said extension, and a second rope connected with the rake for holding it in position while raking and rising, and permitting it also to dump, substantially as set forth.

2. The combination, with the main frame and the vertically-swinging lifting-frame journaled thereon, of a rake journaled on the forward end of the lifting-frame and having an upward-extending arm, an angle-lever mounted on the rear portion of the main frame and having an upwardly-extending member, and a connection between the upward-projecting member of said lever and the said rake-arm, substantially as set forth.

3. The combination, with the main frame and the vertically-swinging lifting-frame provided at its forward end with a dumping-rake having an upwardly-extending arm, of a lever journaled on the main frame and provided with an upwardly and a downwardly extending arm, means for locking the downwardly-extending arm to the main frame, and a connection between the upwardly-extending arm and the rake-arm.

4. In a hay rake and stacker, the combination, with a base-frame and a perpendicular frame secured to the base-frame, of a lifting-frame fulcrumed upon the perpendicular frame, having an angular rear end overhanging the rear portion of the base-frame, a rake journaled in the forward end of the lifting-frame, an angled lever fulcrumed upon the perpendicular frame between the side bars of the lifting-frame, a rope connecting the angled lever and the rake, a drum journaled in the perpendicular frame, having a toothed head, a shaft journaled above said drum, provided with a pinion meshing with the head, a pulley secured to the rear end of the lifting-frame, a second pulley secured to the rear extension of the base-frame, and a rope secured to said rear extension, passing over the said pulleys, and connecting with the said drum, all combined for operation substantially as shown and described.

5. In a hay rake and stacker, the combination, with a portable frame, of an angular lifting-frame fulcrumed at the rear of its center, brace-rods connecting the members of the said frame, and a rake journaled in the forward end of the lifting-frame, and a rope connected with the rake for holding it in position while raking and rising and permitting it also to dump, all combined for operation as and for the purpose specified.

PETER HEINTZ.

Witnesses:
F. TSCHAUDER,
JAMES O. WEST.